2 Sheets—Sheet 1.
C. H. THOMPSON.
MANUFACTURE OF PLOW-SHARES.
No. 189,150. Patented April 3, 1877.
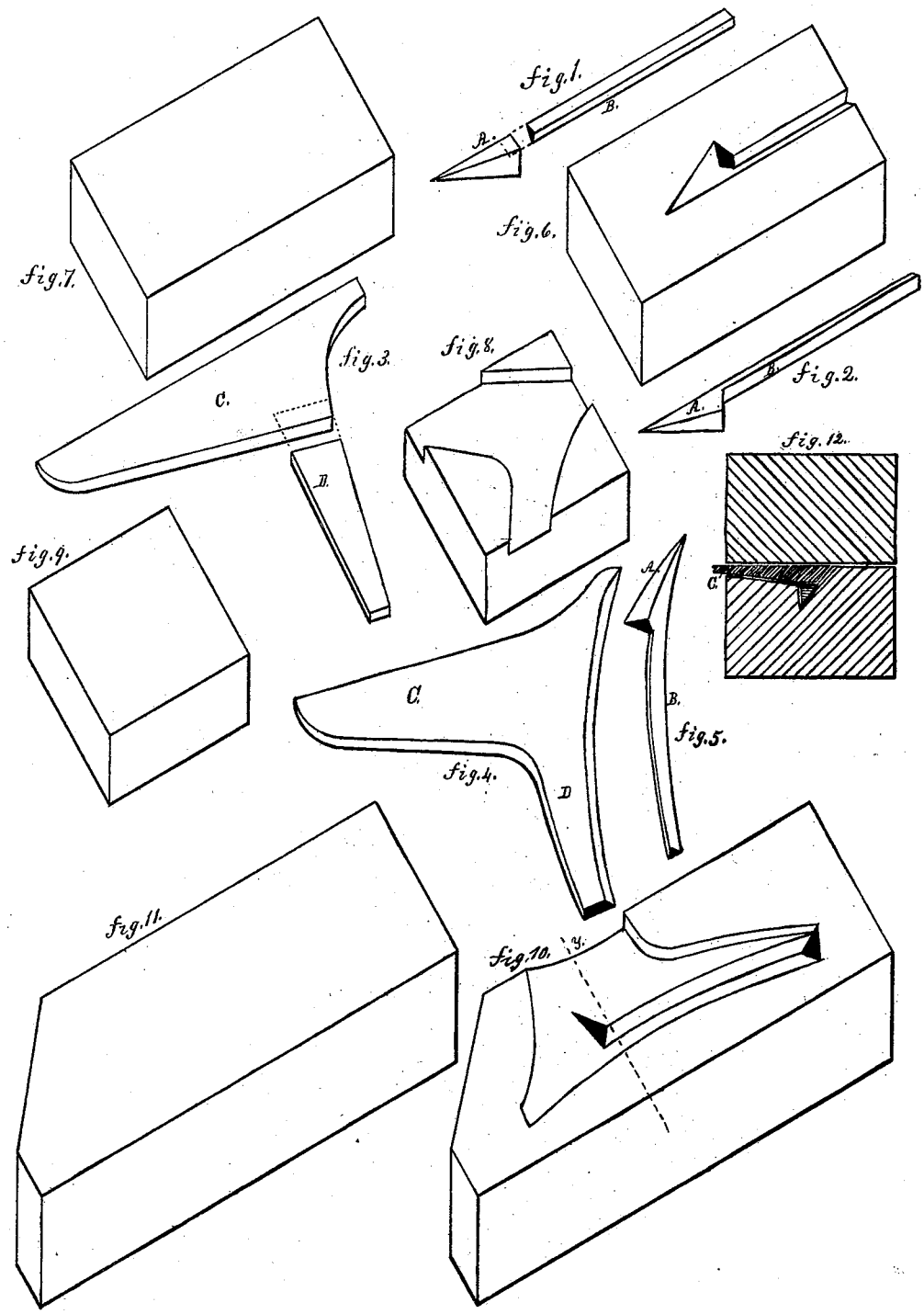
Witnesses:
Inventor:
C. H. Thompson

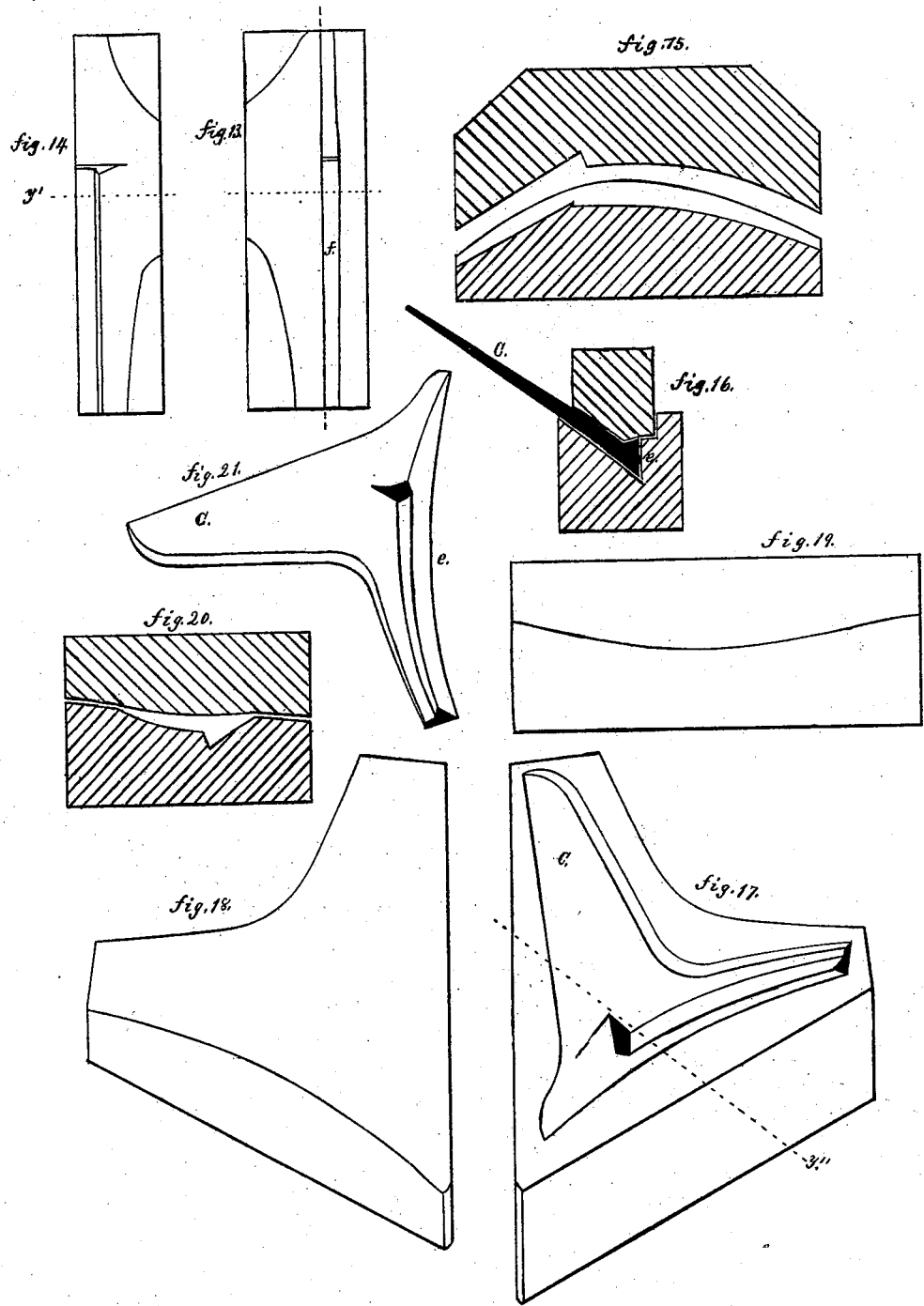

UNITED STATES PATENT OFFICE.

CHARLES H. THOMPSON, OF PITTSBURG, PENNSYLVANIA.

IMPROVEMENT IN THE MANUFACTURE OF PLOWSHARES.

Specification forming part of Letters Patent No. 189,150, dated April 3, 1877; application filed September 8, 1876.

*To all whom it may concern:*

Be it known that I, C. H. THOMPSON, of Pittsburg, in the county of Allegheny and State of Pennsylvania, have invented a new and useful Improvement in the Manufacture of Plowshares; and I do hereby declare that the following is a full and exact description thereof, reference being had to the accompanying drawings, and to the letters of reference marked thereon.

My invention relates to the manufacture of plowshares; and consists in the method hereinafter described for constructing them.

To enable others skilled in the art with which my invention is most nearly connected to make and use it, I will proceed to describe its construction and operation.

In the accompanying drawings, which form part of my specification, Figures 1, 2, 3, 4, and 5 are a series of blanks of steel, semi-steel, or wrought-iron, which are welded together through the medium of a series of dies shown in Figs. 6, 7, 8, 9, 10, 11, and 12, and subsequently the desired contour given to the share through the medium of the dies shown in Figs. 13, 14, 15, 16, 17, 18, 19, and 20.

In the accompanying drawings, Fig. 6 is the bottom, and Fig. 7 the top, die of the first pair of dies. Fig. 8 is the bottom, and Fig. 9 the top, die of the second pair of dies. Fig. 10 is the bottom, and Fig. 11 the top, die of the third pair of dies, Fig. 12 being a transverse and vertical section of them at line $y$ of Fig. 10. Fig. 13 is a face view of the bottom die, and Fig. 14 is a face view of the top die, of the first pair of forming-dies. Fig. 15 is a longitudinal and vertical section of the first pair of forming-dies. Fig. 16 is a vertical and transverse section of the same at line $y'$ of Figs. 14 and 15. Fig. 17 is the bottom die, and Fig. 18 is the top die, of the second pair of forming-dies. Fig. 19 is a side view of the second pair of forming-dies, and Fig. 20 is a vertical and transverse section of the same at line $y''$ of Fig. 17. Fig. 21 represents the finished plowshare.

The blanks A and B are cut from suitably-formed steel, semi-steel, or wrought-iron, heated to the proper degree, stuck together, and then placed in the first pair of dies 6 and 7 and welded together by one or more strokes of the upper die, thereby forming the blank represented in Fig. 2, which is subsequently bent, as shown in Fig. 5.

The blanks C and D (shown in Fig. 3) are cut from a sheet of steel, semi-steel, or wrought-iron, heated to the proper degree, stuck together, as indicated by dotted lines in Fig. 3, placed in the second pair of dies, (shown in Figs. 8 and 9,) and welded together by one or more strokes of the upper die, thereby forming the blank shown in Fig. 4.

The blanks 4 and 5, being heated to the proper degree, are stuck together and placed in the third pair of dies, (shown in Figs. 10 and 11,) and welded together, forming the plowshare, (shown in Fig. 21,) which is heated, and the edge $e$ inserted in the groove $f$ in the first pair of forming-dies, (shown in Figs. 13 and 14,) and subjected to one or more strokes of the upper die. The share is then removed from these dies and placed in the second pair of forming-dies, (shown in Figs. 17 and 18,) and subjected to one or more strokes of the upper die, whereby the desired contour is given to the share, (shown in Fig. 21,) which is afterward subjected to the tempering, grinding, and polishing process for the purpose of giving it the desired finish.

From the foregoing description, it will be observed that the plowshare is represented as being constructed of steel, semi-steel, or wrought-iron; but it may be constructed of these materials separately or combined.

Through the medium of the method hereinbefore described, plowshares of any desired form known to the trade may be constructed with great facility and economy as to cost, when the material of which they are constructed is taken into consideration.

Having thus described my improvement, what I claim as of my invention is—

1. As an improvement in the manufacture of plowshares, the method hereinbefore described and set forth—that is, passing the blanks A, B, C, and D through a series of dies, for the purpose of welding them together and forming a complete plowshare, substantially as described.

2. As an improvement in the manufacture of plowshares, the series of dies shown and described, for the purpose set forth.

C. H. THOMPSON.

Witnesses:
JAMES J. JOHNSTON,
S. L. HUBBARD.